United States Patent
Chen (10) Patent No.: US 11,358,590 B2
(45) Date of Patent: Jun. 14, 2022

(54) SWITCHING METHOD OF AUTOMATIC DRIVING MODE, APPARATUS AND READABLE STORAGE MEDIUM

(71) Applicant: Baidu Online Network Technology (Beijing) Co., Ltd., Beijing (CN)

(72) Inventor: Youhan Chen, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 233 days.

(21) Appl. No.: 16/514,149

(22) Filed: Jul. 17, 2019

(65) Prior Publication Data
US 2020/0079355 A1    Mar. 12, 2020

(30) Foreign Application Priority Data

Sep. 6, 2018 (CN) .......................... 201811035934.3

(51) Int. Cl.
*B60W 30/02* (2012.01)
*G05D 1/00* (2006.01)
*B60W 40/06* (2012.01)

(52) U.S. Cl.
CPC .......... *B60W 30/025* (2013.01); *B60W 40/06* (2013.01); *G05D 1/0088* (2013.01);
(Continued)

(58) Field of Classification Search
CPC ............... B60W 30/025; B60W 40/06; B60W 2540/043; B60W 2552/00;
(Continued)

(56) References Cited

U.S. PATENT DOCUMENTS

| 8,634,980 B1 | 1/2014 | Urmson et al. |
| 9,947,052 B1 * | 4/2018 | Slusar .............. G08G 1/096775 |

(Continued)

FOREIGN PATENT DOCUMENTS

| CN | 106004878 A | 10/2016 |
| CN | 106184223 A | 12/2016 |

(Continued)

OTHER PUBLICATIONS

First Office Action of corresponding Chinese patent application No. 2018110359343 (eight pages).

(Continued)

*Primary Examiner* — Marthe Y Marc-Coleman
(74) *Attorney, Agent, or Firm* — Harness, Dickey & Pierce, P.L.C.

(57) ABSTRACT

Provided are a switching method of an automatic driving mode, an apparatus, and a readable storage medium. The method includes determining an identity of a user riding an automatic driving device; determining, according to the identity of the user, a target automatic driving mode matched with the identity of the user from multiple pre-stored automatic driving modes; and controlling, according to the target automatic driving mode, the automatic driving device to perform a current automatic driving task. The method can adopt different automatic driving modes to perform a current automatic driving task according to differences of identities of users and provide the users with experiences riding an automatic driving device that are more suited to their requirements.

13 Claims, 4 Drawing Sheets

(52) U.S. Cl.
CPC ... *B60W 2400/00* (2013.01); *B60W 2540/043* (2020.02); *B60W 2552/00* (2020.02); *G05D 2201/0213* (2013.01)

(58) Field of Classification Search
CPC ......... B60W 2400/00; B60W 2540/30; B60W 2540/00; B60W 2050/0095; B60W 2015/0075; B60W 2050/0077; B60W 30/182; B60W 50/082; B60W 40/08; G05D 1/0088; G05D 2201/0213; G05D 1/0061
See application file for complete search history.

(56) References Cited

U.S. PATENT DOCUMENTS

| | | | |
|---|---|---|---|
| 10,692,371 B1* | 6/2020 | Nix | G01S 5/14 |
| 2015/0158486 A1 | 6/2015 | Healey et al. | |
| 2017/0267256 A1 | 9/2017 | Minster et al. | |
| 2018/0050698 A1* | 2/2018 | Polisson | B60W 60/00 |
| 2018/0220948 A1 | 8/2018 | Kojima | |
| 2019/0049957 A1* | 2/2019 | Healey | G06N 3/08 |
| 2019/0232974 A1* | 8/2019 | Reiley | B60W 60/0013 |
| 2020/0064833 A1* | 2/2020 | Fox | G06K 9/00845 |

FOREIGN PATENT DOCUMENTS

| | | | | |
|---|---|---|---|---|
| CN | 107807625 A | 3/2018 | | |
| CN | 107949514 A | 4/2018 | | |
| CN | 108248608 A | 7/2018 | | |
| JP | WO2012090312 A1 * | 6/2014 | ......... G06K 9/00208 |
| JP | 2017197066 A | 11/2017 | | |
| JP | 2018105774 A | 7/2018 | | |
| WO | 2017044495 A1 | 3/2017 | | |

OTHER PUBLICATIONS

Second Office Action of corresponding European patent application No. 19187257.1 (eight pages).

* cited by examiner

SWITCHING METHOD OF AUTOMATIC DRIVING MODE, APPARATUS AND READABLE STORAGE MEDIUM

CROSS-REFERENCE TO RELATED APPLICATIONS

This application claims priority to Chinese Patent Application No. 201811035934.3, filed on Sep. 6, 2018, entitled "Switching Method of Automatic Driving Mode, Apparatus and Readable Storage Medium", which is incorporated herein by reference in its entirety.

TECHNICAL FIELD

The present disclosure relates to the field of automatic driving technology and, in particular, to a switching method of an automatic driving mode, an apparatus and a readable storage medium.

BACKGROUND

With the development of science and technology and the progress of society, the automatic driving technology has become a development trend in the field of transportation. It becomes a hot topic that how to make an automatic driving device capable of judging various road conditions and then make corresponding driving behaviors, and improve the intelligent degree of the automatic driving device.

In the existing automatic driving technology, the automatic driving device implements automatic driving according to a preset automatic driving mode, that is, an automatic driving mode that includes multiple driving operation instructions and is set within the automatic driving device; when the automatic driving device performs a driving task, the automatic driving device may select a corresponding instruction from the driving operation instructions in the automatic driving mode according to the obtained current road conditions, and perform the selected instruction.

However, since the automatic driving mode is preset by a developer, and each user has different sensory experiences and riding habits, the automatic driving device cannot make corresponding adjustment according to characteristic of each user when performing a corresponding operation according to the automatic driving mode, which results in a poor riding feeling of the existing manned automatic driving device.

SUMMARY

In view of the problem of a poor riding feeling of the user as a result of the fact that the automatic driving device cannot make corresponding adjustment according to characteristic of each user, the present disclosure provides a switching method and a switching apparatus of an automatic driving mode, and a readable storage medium.

In one aspect, the present disclosure provides a switching method of an automatic driving mode, including:
determining an identity of a user riding an automatic driving device;
determining, according to the identity of the user, a target automatic driving mode matched with the identity of the user from a multiple pre-stored automatic driving modes; and
controlling the automatic driving device to perform a current automatic driving task.

In an optional embodiment, the controlling, according to the target automatic driving mode, the automatic driving device to perform a current automatic driving task, includes:
collecting current road condition information;
determining, according to the current road condition information, a target driving operation instruction matched with the current road condition information from multiple driving operation instructions corresponding to the target automatic driving mode; and
performing the target driving operation instruction.

In an optional embodiment, the switching method further includes:
determining, according to the identity of the user, a working state of each in-vehicle device in the automatic driving device.

In an optional embodiment, the switching method further includes:
collecting sensory information of the user on the target automatic driving mode;
optimizing, according to the sensory information, the target automatic driving mode.

In an optional embodiment, the sensory information includes one or more of the following information: a push-back feeling, a centrifugal feeling, a bumpy feeling, a forward leaning feeling, a frustrating feeling and a shaking feeling.

In an optional embodiment, the determining an identity of a user riding an automatic driving device, includes:
collecting a biological feature of the user riding the automatic driving device;
determining the identity of the user according to a preset biological feature database, wherein the biological feature database includes a biological feature of each user.

In an optional embodiment, the determining the identity of the user according to a preset biological feature database, includes:
determining a population label of the user according to the biological feature of the user and taking an identity corresponding to the population label as the identity of the user, if the identity of the user is not pre-stored in the biological feature database.

In another aspect, the present disclosure provides a switching apparatus of an automatic driving mode, including:
an identity identifying module configured to determine an identity of a user riding an automatic driving device;
a switching module configured to determine, according to the identity of the user, a target automatic driving mode matched with the identity of the user from multiple pre-stored automatic driving modes; and
a performing module configured to control, according to the target automatic driving mode, the automatic driving device to perform a current automatic driving task.

In an optional embodiment, the performing module is specifically configured to collect current road condition information; determine, according to the current road condition information, a target driving operation instruction matched with the current road condition information from multiple driving operation instructions corresponding to the target automatic driving mode; and perform the target driving operation instruction.

In an optional embodiment, the switching module is further configured to:
determine, according to the identity of the user, a working state of each in-vehicle device in the automatic driving device.

In an optional embodiment, the apparatus further includes: an optimizing module:

the optimizing module is configured to collect sensory information of the user on the target automatic driving mode; and optimize the target automatic driving mode according to the sensory information.

In an optional embodiment, the sensory information includes one or more of the following information: a push-back feeling, a centrifugal feeling, a bumpy feeling, a forward leaning feeling, a frustrating feeling and a shaking feeling.

In an optional embodiment, the identity identifying module is specifically configured to collect a biological feature of the user riding the automatic driving device; and determine the identity of the user according to a preset biological feature database, wherein the biological feature database includes a biological feature of each user.

In an optional embodiment, the identity identifying module is specifically configured to determine a population label of the user according to the biological feature of the user and take an identity corresponding to the population label as the identity of the user, if the identity of the user is not pre-stored in the biological feature database.

In still another aspect, the present disclosure provides a switching apparatus of an automatic driving mode, including: a memory, a processor coupled to the memory, and a computer program stored on the memory and runnable on the processor, wherein, the method described above is performed when the processor runs the computer program.

In a last aspect, the present disclosure provides a readable storage medium, including a program, wherein when the program runs on a terminal, the terminal performs any one of the methods described above.

By determining an identity of a user riding an automatic driving device, determining, according to the identity of the user, a target automatic driving mode matched with the identity of the user from multiple pre-stored automatic driving modes, and controlling, according to the target automatic driving mode, the automatic driving device to perform a current automatic driving task, the switching method and switching apparatus of an automatic driving mode and the readable storage medium provided by the present disclosure can adopt different automatic driving modes to perform a current automatic driving task according to differences of identities of users and provide the users with experiences riding an automatic driving device that are more suited to their requirements.

BRIEF DESCRIPTION OF THE DRAWINGS

The embodiments of the present disclosure have been shown explicitly by the accompanying drawings, and will be described in more detail below. These drawings and descriptions are not intended to limit the scope of conception of the present disclosure in any way, but rather to illustrate the concept of the present disclosure to those skilled in the art by reference to specific embodiments.

The accompanying drawings herein are incorporated into the specification and form a part of the specification, showing embodiments conforming to the present disclosure, and explaining the principle of the present disclosure together with the specification.

DESCRIPTION OF EMBODIMENTS

To make the purposes, technical solutions and advantages of the embodiments of the present disclosure clearer, the technical solutions in the embodiments of the present disclosure will be clearly and completely described below with reference to the drawings in the embodiments of the present disclosure.

With the development of science and technology and the progress of society, the automatic driving technology has become a development trend in the field of transportation. It becomes a hot topic that how to make an automatic driving device capable of judging various road conditions and then make corresponding driving behaviors, and improve the intelligent degree of the automatic driving device.

In the existing automatic driving technology, the automatic driving device implements automatic driving according to a preset automatic driving mode, that is, an automatic driving mode that includes multiple driving operation instructions and is set within the automatic driving device; when the automatic driving device performs a driving task, the automatic driving device may select a corresponding instructions from the driving operation instructions in the automatic driving mode according to the obtained current road conditions, and perform the selected instruction.

However, since the automatic driving mode is preset by a developer, and each user has different sensory experience and riding habits, the automatic driving device cannot make corresponding adjustment according to characteristic of each user when performing a corresponding operation according to the automatic driving mode, which results in a poor riding feeling of the existing manned automatic driving device.

In view of the problem of a poor riding feeling of the user as a result of the fact that the automatic driving device cannot make corresponding adjustment according to characteristic of each user, the present disclosure provides a switching method and a switching apparatus of an automatic driving mode, and a readable storage medium.

Figure 1:
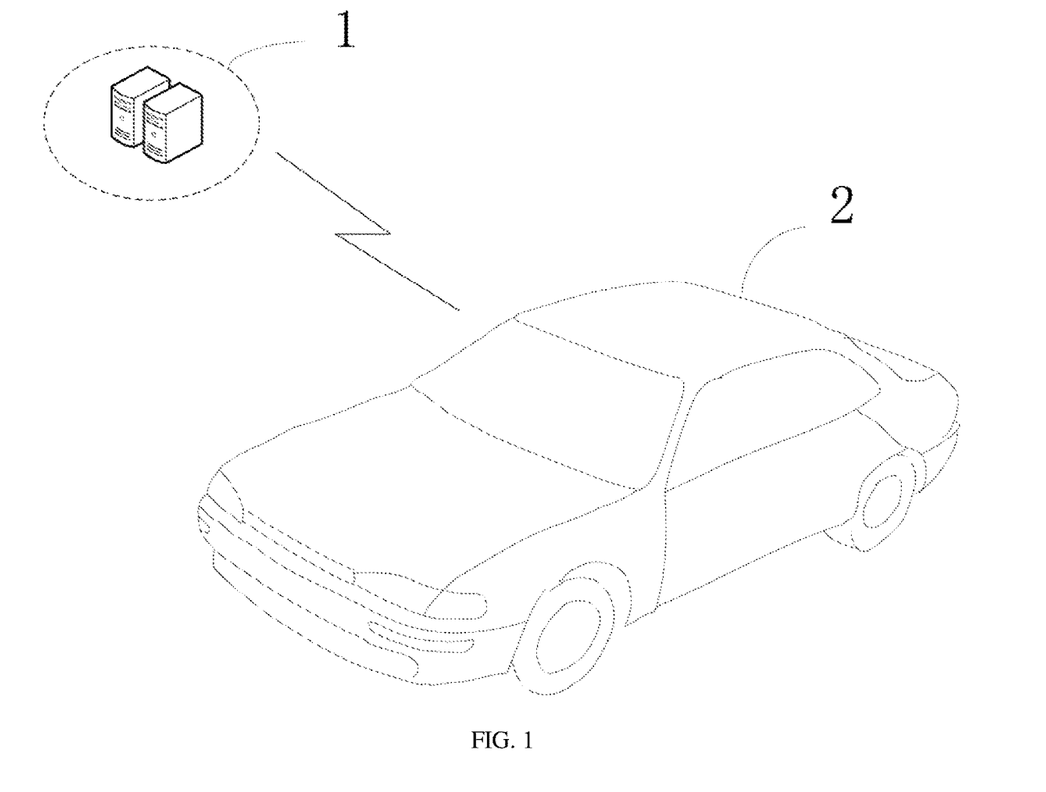
FIG. 1 is a schematic diagram of a wireless architecture on which the present disclosure is based.

It should be noted that, FIG. 1 is a schematic diagram of a network architecture on which the present disclosure is based. As shown in FIG. 1, the network architecture on which the present application is based includes an automatic driving mode switching apparatus 1 and an automatic driving device 2. Wherein, the automatic driving mode switching apparatus 1 can be set within the automatic driving device 2, and can implement interaction of information and data with the user through a physical hardware device; the automatic driving mode switching apparatus 1 also implements the interaction of information and data with the automatic driving device 2 through electrical connection or wireless connection. In addition, the automatic driving device 2 can specifically be an unmanned vehicle such as an unmanned car and an unmanned aircraft.

Figure 2:
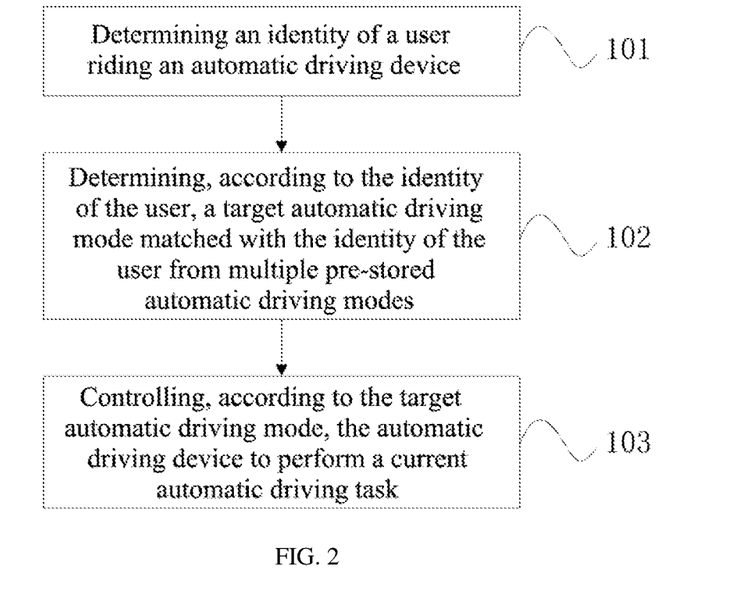
FIG. 2 is a schematic flowchart of a switching method of an automatic driving mode according to Embodiment I of the present disclosure.

FIG. 2 is a schematic flowchart of a switching method of an automatic driving mode according to Embodiment I of the present disclosure. As shown in FIG. 2, the switching method of an automatic driving mode includes:

Step 101: determining an identity of a user riding an automatic driving device.

Step 102: determining, according to the identity of the user, a target automatic driving mode matched with the identity of the user from multiple pre-stored automatic driving modes.

Step 103: controlling, according to the target automatic driving mode, the automatic driving device to perform a current automatic driving task.

It should be noted that an executive entity of the switching method of an automatic driving mode provided in Embodiment I can specifically be an automatic driving mode switching apparatus, and the automatic driving mode switching apparatus can specifically be a control platform that is set in the automatic driving device and can interact with the user.

Specifically, in the switching method of an automatic driving mode provided in Embodiment I, when a user rides the automatic driving device, an automatic driving mode switching apparatus will determine an identity of the user. Wherein, various methods can be used for determining the identity of the user, for example, the identity of the user can be determined by receiving a user account input by the user, or the identity of the user can be determined by receiving identity information sent by the user through a sensing device.

Subsequently, the automatic driving mode switching apparatus will determine, according to the identity of the user, a target automatic driving mode matched with the identity of the user from multiple pre-stored automatic driving modes, wherein each automatic driving mode can be preset by a developer or set by the user, and this is not limited herein. In addition, it should be noted that push back feeling, centrifugal feeling, bumpy feeling, forward leaning feeling, frustrating feeling and shaking feeling felt by users are different based on differences of identities of users when riding the automatic driving device. Therefore, by adopting different automatic driving modes to control the automatic driving device to perform a corresponding automatic driving operation instruction, each automatic driving mode can provide users having different identities with different ride experiences including the push back feeling, the centrifugal feeling, the bumpy feeling, the forward leaning feeling, the frustrating feeling and the shaking feeling, when facing the same road condition.

Finally, the automatic driving mode switching apparatus controls, according to the target automatic driving mode, the automatic driving device to perform the current automatic driving task. Specifically, after determining the target automatic driving mode, the automatic driving mode switching apparatus can collect current road condition information, and then determine, according to the current road condition information, a target driving operation instruction matched with the current road condition information from multiple driving operation instructions corresponding to the target automatic driving mode, and control the automatic driving device to perform the target driving operation instruction to complete a current driving task.

That is to say, by determining an identity of a user riding an automatic driving device, determining, according to the identity of the user, a target automatic driving mode matched with the identity of the user from multiple pre-stored automatic driving modes, and controlling, according to the target automatic driving mode, the automatic driving device to perform a current automatic driving task, it is possible to adopt different automatic driving modes to perform a current automatic driving task according to differences of identities of users and provide the users with experiences riding an automatic driving device that are more suited to their requirements.

While in other optional embodiment, the automatic driving mode switching apparatus can also determine the identity of the user by collecting a biological feature of the user riding the automatic driving device. Specifically, a biological feature database is preset within the automatic driving mode switching apparatus, and the biological feature database includes pre-stored biological features of multiple users, wherein the biological features include, but are not limited to, facial contour features, iris features, fingerprint features, vein texture features, body shape and posture features, and the like.

Further, in general, the biological feature database should include a biological feature of each user, but in the case where the identity of the user cannot be determined according to the existing biological feature database, a population label of the user can be determined according to a biological feature of the user, and an identity corresponding to the population label is taken as the identity of the user. Specifically, the population label is generally used to indicate a class of people with the same or similar feature attribute, such as "women older than 70", and the people with the same or similar feature attribute maybe have similar preference for the automatic driving mode. Therefore, when a user has never taken the automatic driving device before, the biological feature of the user may not be pre-stored in the biological feature database, and at this time, an identity corresponding to the population label of the user may be taken as the target automatic driving mode. Of course, in the case where the identity of the user cannot be determined according to the existing biological feature database, any one automatic driving mode selected by the user from various automatic driving modes can also be received to be used as the target automatic driving mode and be performed; at the same time, the automatic driving mode switching apparatus will save the biological feature of the user and the automatic driving mode selected by the user for subsequent use.

In addition, in other optional embodiment, the switching method further includes determining, according to the identity of the user, a working state of each in-vehicle device in the automatic driving device. Specifically, in-vehicle devices are generally installed in the automatic driving device; these in-vehicle devices include, but not limited to, an air conditioner, an intelligent seat, an intelligent video and audio system, a lighting system, and the like. In the present embodiment, in order to further improve the ride experience of the user, after determining the identity of the user, the automatic driving mode switching apparatus can switch the working state of each in-vehicle device in the automatic driving device to a working state corresponding to the identity of the user. For example, if a user prefers to switch an air conditioning mode to low wind, with the wind blowing to the face, then the automatic driving mode switching device can, after obtaining the identity of the user, directly switch the air conditioner to a working state of low wind and wind blowing to the face, thereby providing the user with a service that is better suited to use requirement and ride requirement of the user.

By determining an identity of a user riding an automatic driving device, determining, according to the identity of the user, a target automatic driving mode matched with the identity of the user from multiple pre-stored automatic driving modes, and controlling, according to the target automatic driving mode, the automatic driving device to perform a current automatic driving task, the switching method and apparatus of an automatic driving mode and the readable storage medium provided by the present disclosure can adopt different automatic driving modes to perform a current automatic driving task according to differences of identities of users and provide the users with ride experiences for an automatic driving device that are more suited to their requirements.

Figure 3:
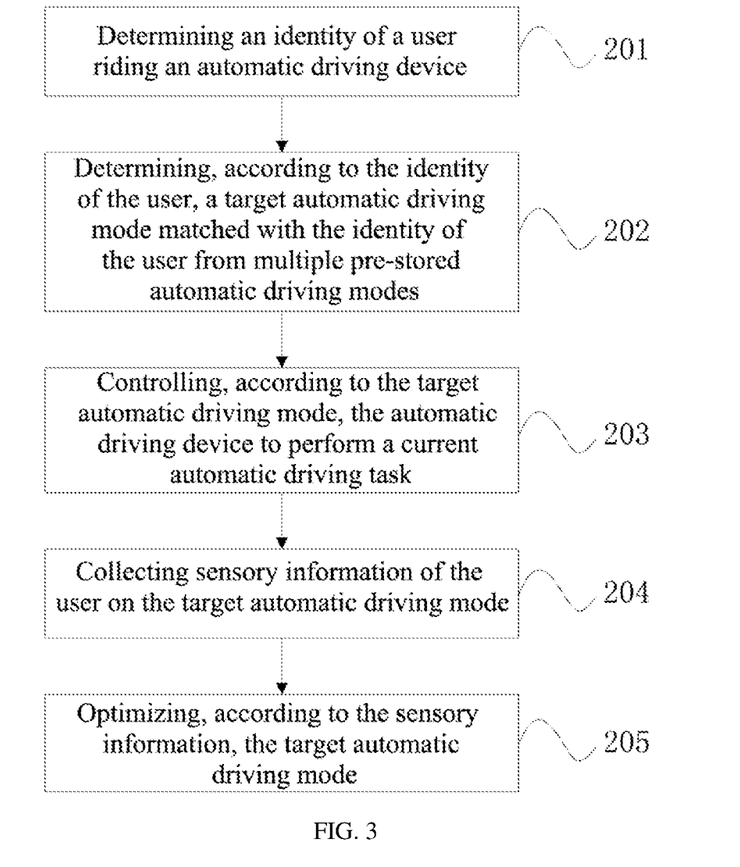
FIG. 3 is a schematic flowchart of a switching method of an automatic driving mode according to Embodiment II of the present disclosure.

In order to further explain the switching method of an automatic driving mode provided by the present disclosure, FIG. 3 is a schematic flowchart of a switching method of an automatic driving mode according to Embodiment II of the present disclosure. As shown in FIG. 3, the switching method of an automatic driving mode includes:

Step 201: determining an identity of a user riding an automatic driving device.

Step 202: determining, according to the identity of the user, a target automatic driving mode matched with the identity of the user from multiple pre-stored automatic driving modes.

Step 203: controlling, according to the target automatic driving mode, the automatic driving device to perform a current automatic driving task.

Step 204: collecting sensory information of the user on the target automatic driving mode.

Step 205: optimizing, according to the sensory information, the target automatic driving mode.

It should be noted that, similar to Embodiment I, an executive entity of the switching method of an automatic driving mode provided in Embodiment II can specifically be an automatic driving mode switching apparatus, and the automatic driving mode switching apparatus can specifically be a control platform that is set in the automatic driving device and can interact with the user.

Specifically, when a user rides the automatic driving device, an automatic driving mode switching device will determine an identity of the user. Wherein, various methods can be used for determining the identity of the user, for example, the identity of the user can be determined by receiving the user account input by the user, or the identity of the user can be determined by receiving identity information sent by the user through a sensing device.

Subsequently, the automatic driving mode switching apparatus will determine, according to the identity of the user, a target automatic driving mode matched with the identity of the user from multiple pre-stored automatic driving modes, wherein each automatic driving mode can be preset by a developer or set by the user, and this is not limited herein. In addition, it should be noted that push back feeling, centrifugal feeling, bumpy feeling, forward leaning feeling, frustrating feeling and shaking feeling felt by users are different based on differences of identities of users when riding the automatic driving device. Therefore, by adopting different automatic driving modes to control the automatic driving device to perform a corresponding automatic driving operation instruction, each automatic driving mode can provide users having different identities with different ride experiences including the push back feeling, the centrifugal feeling, the bumpy feeling, the forward leaning feeling, the frustrating feeling and the shaking feeling, when facing the same road condition.

The automatic driving mode switching apparatus controls, according to the target automatic driving mode, the automatic driving device to perform a current automatic driving task. Specifically, after determining the target automatic driving mode, the automatic driving mode switching apparatus can collect current road condition information, and then determine, according to the current road condition information, a target driving operation instruction matched with the current road condition information from multiple driving operation instructions corresponding to the target automatic driving mode, and control the automatic driving device to perform the target driving operation instruction to complete a current driving task.

Different from Embodiment I, in Embodiment II, the automatic driving mode switching apparatus also collects sensory information of the user on the target automatic driving mode, wherein this step can be performed synchronously with the step of the automatic driving device performing the current automatic driving task, or can be performed after the step of the automatic driving device performing the current automatic driving task, and this is not limited in the present embodiment. After the automatic driving mode switching apparatus obtains the sensory information, the target automatic driving mode can be optimized according to the sensory information, so that the target automatic driving mode can provide a more perfect ride experience.

Specifically, in order to make the target automatic driving mode more suited to requirements of the user and give the user a more perfect ride experience, the user can feed back his sensory information to the automatic driving mode switching apparatus from multiple dimensions, such as a push back feeling, a centrifugal feeling, a bumpy feeling, a forward leaning feeling, a frustrating feeling and a shaking feeling. Wherein, the push back feeling refers to making people feel that backs of chairs are pressings tightly against their backs and pushing them forward; the centrifugal feeling refers to making people feel that they are being pressed tightly or thrown out in a certain lateral direction; the bumpy feeling refers to making people feel that they are leaving seats and going into the air accompanying with a certain degree of weightlessness; the forward leaning feeling refers to making people feel that their bodies are leaning forward accompanying with nod to a certain extent sometimes; the frustrating feeling refers to making people have a feel of unsmooth driving or carsickness; the shaking feeling refers to making people feel that a driving strategy of a vehicle is unsafe and unreliable, and a behavior track is swinging. By setting at least one of the sensory information with the above dimensions, the automatic driving mode switching apparatus can adjust and optimize each driving operation instruction in the target automatic driving mode from multiple dimensions to improve an experience of the user.

While in other optional embodiment, the automatic driving mode switching apparatus can determine an identity of a user by collecting a biological feature of the user riding the automatic driving device. Specifically, a biological feature database is preset in the automatic driving mode switching apparatus, and the biological feature database includes pre-stored biological features of multiple users, wherein the biological features include, but are not limited to, facial contour features, iris features, fingerprint features, vein texture features, body shape and posture features, and the like.

Further, in general, the biological feature database should include a biological feature of each user, but in the case where the identity of the user cannot be determined according to the existing biological feature database, a population label of the user can be determined according to a biological feature of the user, and an identity corresponding to the population label is taken as the identity of the user. Specifically, the population label is generally used to indicate a class of people with the same or similar feature attribute, such as "women older than 70", and the people with the same or similar feature attribute maybe have similar preference for the automatic driving mode. Therefore, when a user has never taken the automatic driving device before, the biological feature of the user may not be pre-stored in the biological feature database, and at this time, an identity corresponding to the population label of the user may be taken as the target automatic driving mode. Of course, in the case where the identity of the user cannot be determined according to the existing biological feature database, any one automatic driving mode selected by the user from various automatic driving modes can also be received to be used as the target automatic driving mode and be performed; at the same time, the automatic driving mode switching apparatus will save the biological feature of the user and the automatic driving mode selected by the user for subsequent use.

In addition, in other optional embodiment, the switching method further includes determining, according to the identity of the user, a working state of each in-vehicle device in the automatic driving device. Specifically, in-vehicle devices are generally installed in the automatic driving device; these in-vehicle devices include, but not limited to, an air conditioner, an intelligent seat, an intelligent video and audio system, a lighting system, and the like. In the present embodiment, in order to further improve the ride experience of the user, after determining the identity of the user, the automatic driving mode switching apparatus can switch the working state of each in-vehicle device in the automatic driving device to a working state corresponding to the identity of the user. For example, if a user prefers to switch an air conditioning mode to low wind, with the wind blowing to the face, then the automatic driving mode switching device can, after obtaining the identity of the user, directly switch the air conditioner to a working state of low wind and wind blowing to the face, thereby providing the user with a service that is better suited to use requirement and ride requirement of the user.

By determining an identity of a user riding an automatic driving device, determining, according to the identity of the user, a target automatic driving mode matched with the identity of the user from multiple pre-stored automatic driving modes, and controlling, according to the target automatic driving mode, the automatic driving device to perform a current automatic driving task, the switching method and the switching apparatus of an automatic driving mode and the readable storage medium provided by the present disclosure can adopt different automatic driving modes to perform a current automatic driving task according to differences of identities of users and provide the users with ride experiences for an automatic driving device that are more suited to their requirements.

Figure 4:
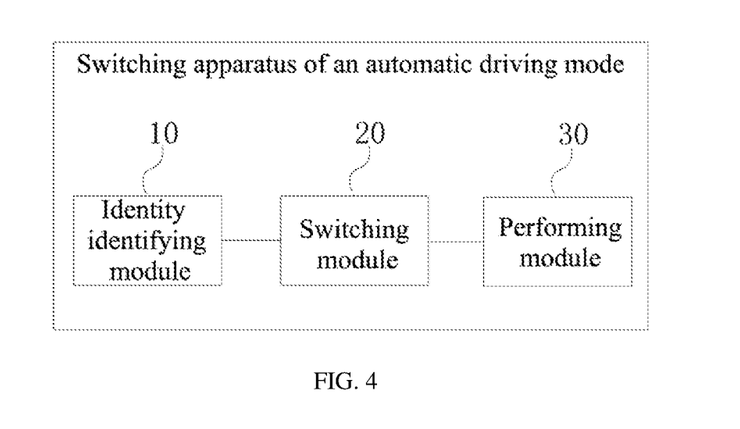
FIG. 4 is a schematic structural diagram of a switching apparatus of an automatic driving mode according to Embodiment III of the present disclosure.

FIG. 4 is a schematic structural diagram of a switching apparatus of an automatic driving mode according to Embodiment III of the present disclosure. As shown in FIG. 4, the switching apparatus of an automatic driving mode includes:

an identity identifying module 10 configured to determine an identity of a user riding an automatic driving device;

a switching module 20 configured to determine, according to the identity of the user, a target automatic driving mode matched with the identity of the user from multiple pre-stored automatic driving modes; and a performing module 30 configured to control, according to the target automatic driving mode, the automatic driving device to perform a current automatic driving task.

In an optional embodiment, the performing module 30 is specifically configured to collect current road condition information; determine, current road condition information, a target driving operation instruction matched with the current road condition information from multiple driving operation instructions corresponding to the target automatic driving mode, and perform the target driving operation instruction.

In an optional embodiment, the switching module 20 is further configured to:

determine, according to the identity of the user, a working state of each in-vehicle device in the automatic driving device.

In an optional embodiment, the apparatus further includes: an optimizing module:

the optimizing module is configured to collect sensory information of the user on the target automatic driving mode, and optimize the target automatic driving mode according to the sensory information.

In an optional embodiment, the sensory information includes one or more of the following information: a push-back feeling, a centrifugal feeling, a bumpy feeling, a forward leaning feeling, a frustrating feeling and a shaking feeling.

In an optional embodiment, the identity identifying module 10 is specifically configured to collect a biological feature of the user riding the automatic driving device; determine the identity of the user according to a preset biological feature database, wherein the biological feature database includes a biological feature of each user.

In an optional embodiment, the identity identifying module 10 is specifically configured to determine a population label of the user according to the biological feature of the user and take an identity corresponding to the population label as the identity of the user, if the identity of the user is not pre-stored in the biological feature database.

Those skilled in the art can clearly understand that for convenience and brevity of description, specific working processes and corresponding beneficial effects of the system described above can refer to the corresponding processes in the preceding method embodiments and will not be repeated herein.

By determining an identity of a user riding an automatic driving device, determining, according to the identity of the user, a target automatic driving mode matched with the identity of the user from multiple pre-stored automatic driving modes, and controlling, according to the target automatic driving mode, the automatic driving device to perform a current automatic driving task, the switching apparatus of an automatic driving mode provided by the present disclosure can adopt different automatic driving modes to perform a current automatic driving task according to differences of identities of users and provide the user with ride experiences for an automatic driving device that are more suited to their requirements.

Figure 5:
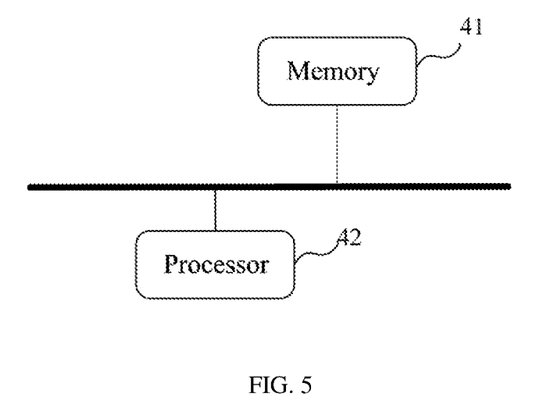
FIG. 5 is a schematic structural diagram of hardware of a switching apparatus of an automatic driving mode according to Embodiment IV of the present disclosure.

FIG. 5 is a schematic structural diagram of hardware of a switching apparatus of an automatic driving mode according to Embodiment IV of the present disclosure. As shown in FIG. 5, the switching apparatus of an automatic driving mode includes: a memory 41, a processor 42, and a computer program stored on the memory 41 and runnable on the processor 42, wherein the method of any one of the previous embodiments is performed when the processor 42 executes the computer program.

The present disclosure also provides a readable storage medium including a program, and when the program is run on a terminal, the terminal performs the method of any one of the previous embodiments.

Those skilled in the art can understand that all or part of the steps to implement the each method embodiment described above may be accomplished by hardware associated with a program instruction. The aforementioned program can be stored in a computer readable storage medium. When the program is executed, steps of the foregoing method embodiments are performed; and the foregoing storage medium includes various media that can store a program code, such as a ROM, a RAM, a magnetic disk, or an optical disk.

Finally, it should be noted that the above embodiments are merely illustrative of the technical solutions of the present disclosure, and are not to being limiting; although the present disclosure has been described in detail with reference to the above embodiments, those skilled in the art will understand that they may still modify the technical solutions described in the above embodiments, or equivalently substitute some or all of the technical features therein; and the modifications or substitutions do not make the essence of the corresponding technical solutions deviate from the scope of the technical solutions of the embodiments of the present disclosure.

What is claimed is:

1. A switching method of an automatic driving mode, comprising:
   determining an identity of a user riding an automatic driving device;
   determining, according to the identity of the user, a target automatic driving mode matched with the identity of the user from multiple pre-stored automatic driving modes; and
   controlling, according to the target automatic driving mode, the automatic driving device to perform a current automatic driving task;
   wherein the determining an identity of a user riding an automatic driving device, comprises:
   collecting a biological feature of the user riding the automatic driving device, wherein the biological feature comprises iris features or body shape and posture features; and
   determining the identity of the user according to a preset biological feature database, if the identity of the user is pre-stored in the biological feature database, wherein the biological feature database comprises an iris feature of each user;
   determining a population label of the user according to a body shape and posture feature of the user and taking an identity corresponding to the population label as the identity of the user, if the identity of the user is not pre-stored in the biological feature database;
   wherein each of the multiple pre-stored automatic driving modes provide users having different identities with different sensory information comprising a push back feeling, a centrifugal feeling, a bumpy feeling, a forward leaning feeling, a frustrating feeling and a shaking feeling, when facing the same road condition.

2. The switching method of an automatic driving mode according to claim 1, wherein the controlling, according to the target automatic driving mode, the automatic driving device to perform a current automatic driving task, comprises:
   collecting current road condition information;
   determining, according to the current road condition information, a target driving operation instruction matched with the current road condition information from multiple driving operation instructions corresponding to the target automatic driving mode; and
   performing the target driving operation instruction.

3. The switching method of an automatic driving mode according to claim 1, further comprising:
   determining, according to the identity of the user, a working state of each in-vehicle device in the automatic driving device.

4. The switching method of an automatic driving mode according to claim 3, further comprising:
   switching the working state of each in-vehicle device in the automatic driving device to a working state corresponding to the identity of the user, wherein in-vehicle devices comprises an air conditioner, an intelligent seat, an intelligent video and audio system, and a lighting system.

5. The switching method of an automatic driving mode according to claim 1, further comprising:
   collecting sensory information of the user on the target automatic driving mode; and
   optimizing, according to the sensory information, the target automatic driving mode.

6. The switching method of an automatic driving mode according to claim 5, wherein the sensory information is fed back by the user.

7. A non-transitory computer readable storage medium, comprising a program, wherein when the program runs on a terminal, the terminal performs the method according to claim 1.

8. The switching method of an automatic driving mode according to claim 1, wherein the push-back feeling refers to making people feel that backs of chairs are pressings tightly against their backs and pushing them forward; the centrifugal feeling refers to making people feel that they are being pressed tightly or thrown out in a lateral direction; the bumpy feeling refers to making people feel that they are leaving seats and going into the air accompanying with a degree of weightlessness; the forward leaning feeling refers to making people feel that their bodies are leaning forward accompanying with nod to an extent; the frustrating feeling refers to making people have a feel of unsmooth driving or carsickness; the shaking feeling refers to making people feel that a driving strategy of a vehicle is unsafe and unreliable, and a behavior track is swinging.

9. The switching method of an automatic driving mode according to claim 1, further comprising:
   receiving any one automatic driving mode selected by the user from various automatic driving modes as the target automatic driving mode if the identity of the user is not determined; and
   saving the biological feature of the user and the automatic driving mode selected by the user for subsequent use.

10. A switching apparatus of an automatic driving mode, comprising: a memory, a processor coupled to the memory, and a computer program stored on the memory and runnable on the processor, wherein the computer program, when executed by the processor, causes the processor to:
   determine an identity of a user riding an automatic driving device;
   determine, according to the identity of the user, a target automatic driving mode matched with the identity of the user from multiple pre-stored automatic driving modes; and control, according to the target automatic driving mode, the automatic driving device to perform a current automatic driving task;
wherein the computer program further causes the processor to:
collect a biological feature of the user riding the automatic driving device, wherein the biological feature comprises iris features or body shape and posture features;
determine the identity of the user according to a preset biological feature database, if the identity of the user is pre-stored in the biological feature database, wherein the biological feature database comprises an iris feature of each user;
determine a population label of the user according to a body shape and posture feature of the user and take an identity corresponding to the population label as the identity of the user, if the identity of the user is not pre-stored in the biological feature database;
wherein each of the multiple pre-stored automatic driving modes provide users having different identities with different sensory information comprising a push back feeling, a centrifugal feeling, a bumpy feeling, a forward leaning feeling, a frustrating feeling and a shaking feeling, when facing the same road condition.

11. The switching apparatus of an automatic driving mode according to claim 10, wherein the computer program further causes the processor to: collect current road condition information; determine, according to the current road condition information, a target driving operation instruction matched with the current road condition information from multiple driving operation instructions corresponding to the target automatic driving mode; and perform the target driving operation instruction.

12. The switching apparatus of an automatic driving mode according to claim 10, wherein the computer program further causes the processor to:
determine, according to the identity of the user, a working state of each in-vehicle device in the automatic driving device.

13. The switching apparatus of an automatic driving mode according to claim 10, wherein the computer program further causes the processor to: collect sensory information of the user on the target automatic driving mode, and optimize the target automatic driving mode according to the sensory information.

* * * * *